United States Patent
Ohyanagi et al.

(10) Patent No.: US 6,936,351 B2
(45) Date of Patent: Aug. 30, 2005

(54) FLEXIBLE NATURAL WOOD SHEET

(75) Inventors: Manshi Ohyanagi, Ootsu (JP); Shin'ichi Higuchi, Osaka (JP); Takeshi Yamamoto, Ootsu (JP)

(73) Assignee: Zeroone Products Inc., Osaka (JP)

( * ) Notice: Subject to any disclaimer, the term of this patent is extended or adjusted under 35 U.S.C. 154(b) by 0 days.

(21) Appl. No.: 10/481,765

(22) PCT Filed: Jun. 28, 2002

(86) PCT No.: PCT/JP02/06540

§ 371 (c)(1),
(2), (4) Date: Dec. 23, 2003

(87) PCT Pub. No.: WO03/002317

PCT Pub. Date: Jan. 9, 2003

(65) Prior Publication Data

US 2004/0209099 A1 Oct. 21, 2004

(30) Foreign Application Priority Data

Jun. 29, 2001 (JP) ......... 2001-198406
Apr. 24, 2002 (JP) ......... 2002-122067

(51) Int. Cl.[7] .............. B32B 23/04
(52) U.S. Cl. ......... 428/532; 428/535; 428/536; 428/537.1
(58) Field of Search .............. 428/532, 535, 428/536, 537.1

(56) References Cited

U.S. PATENT DOCUMENTS 4,461,858 A * 7/1984 Adelman ............ 524/49
4,692,212 A * 9/1987 Swenson et al. ...... 162/206

FOREIGN PATENT DOCUMENTS

| JP | 60-52304 A | 3/1985 |
| JP | 60-236702 A | 11/1985 |
| JP | 60-236704 A | 11/1985 |
| JP | 64-8001 A | 1/1989 |
| JP | 6-126713 A | 5/1994 |
| JP | 7-171806 A | 7/1995 |
| JP | 9-29710 A | 2/1997 |

* cited by examiner

*Primary Examiner*—Ieszek Kiliman
(74) *Attorney, Agent, or Firm*—Keating & Bennett, LLP

(57) ABSTRACT

Cavities in a thin natural wood plate material are filled with a polymer compound to provide softness and folding endurance the thin natural wood plate material. The surface of the thin natural wood plate material is not entirely covered by filling the polymer compound.

13 Claims, 2 Drawing Sheets

US 6,936,351 B2

FLEXIBLE NATURAL WOOD SHEET

BACKGROUND OF THE INVENTION

1. Field of the Invention

The present invention relates to a flexible natural wood sheet having outstanding softness and folding endurance, which is suitable for use as a material for small articles, such as a bag or a pouch.

2. Description of the Related Art

Conventionally, in order to process natural wood in a sheet and to use the sheet to fabricate small articles, such as a bag, a handbag, a wallet, a coin purse, a book cover, a cover sheet, a belt or a pouch, it is necessary to use the natural wood as a soft thin plate. However, when wood, which is a naturally-occurring polymer, is dried, the wood is transformed into a glassy polymer which is brittle and prone to fracture. Thus, a thin plate material is more frequently cracked or broken by bending, contact or other forces. Accordingly, in order to use a thin natural wood plate material, a flexible film made of polyvinyl chloride or other suitable material has been coated on either or both of the surfaces of the thin plate material, or a reinforcing material has been used such that the thin plate material is not cracked or broken even if a brittle fracture occurs.

If a flexible film is attached to a thin natural wood plate material, the flexible film is used to form a laminate structure, or a thin natural wood plate material is coated as described above, the surface of the thin natural wood plate material is covered with a synthetic resin contained in the film or the coating agent. Therefore, the texture and feel inherent to natural wood are lost.

Moreover, although the use of a reinforcing material such as a flexible film improves the folding endurance of the reinforcing material, it does not improve the folding endurance of a thin natural wood plate material.

On the other hand, if a thin natural wood plate material is used for a small article such as a bag or a pouch by utilizing the texture inherent to natural wood, wood including a naturally-occurring polymer is transformed into a glassy polymer in which brittle fractures are likely to occur when it is dried. Therefore, since the thin plate material is often cracked or broken by bending, contact or other forces applied thereto, the thin plate material is difficult to handle. Accordingly, a thin natural wood plate material itself cannot be used without being cracked or broken.

More specifically, there is no thin natural wood plate material having outstanding folding endurance.

Thus, through research, the inventors of the present invention achieved the present invention in consideration of the following facts: wood, which is not cut, has softness and cells of the wood are filled with water, dried wood is used as raw wood processed into a thin plate, and therefore, cells or intercellular spaces of the dried wood are cavities which lack water, other cavities such as vessels or sieve tubes are present in the wood, and lignin in the wood solidifies cellulose in the wood as a paste-like substance as the wood is dried.

SUMMARY OF THE INVENTION

To overcome the problems described above, preferred embodiments of the present invention provide a flexible natural wood sheet in which a cavity in a thin natural wood plate material is filled with a polymer compound so as to greatly improve the folding endurance.

Herein, the folding endurance is defined as a folding endurance as defined in JIS P 8115.

The polymer compound is preferably a mixture of a synthetic resin and a linear polymer compound. A glass transition point of the synthetic resin is preferably at room temperature or lower. The synthetic resin is preferably capable of interacting with a hydroxyl group, According to preferred embodiments of the present invention the synthetic resin preferably includes hydroxyl group In addition, the synthetic resin preferably includes a cellulosic synthetic resin.

A molecular weight of the synthetic resin is preferably about 1,500 to about 100,000.

The synthetic resin is preferably a linear polymer compound, and a vapor pressure of the linear polymer compound at an ambient temperature is preferably about 1.3 kPa or lower. The linear polymer compound is preferably capable of interacting with a hydroxyl group. The linear polymer compound is preferably polyethylene glycol having a molecular weight of polyethylene glycol of about 200 to about 60,000.

According to preferred embodiments of the present invention, a content of the polymer compound filling the cavity of the thin natural wood plate material is preferably about 10% by volume to about 95% by volume. A thickness of the thin natural wood plate material is preferably about 0.1 mm to about 5.0 mm.

A rebound resilience value of the thin natural wood plate material is preferably about 10 times or less that of an original thin plate material.

The above and other elements, characteristics, features, steps and advantages of the present invention will become clear from the following description of preferred embodiments taken in conjunction with the accompanying drawings.

DETAILED DESCRIPTION OF PREFERRED EMBODIMENTS

Preferred embodiments of the present invention provide a flexible natural wood sheet with softness, flexibility, and texture and feeling inherent to natural wood, which has folding endurance obtained by filling cavities present in a thin natural wood plate material such as a cavity in a cell, an intercellular space, a vessel or a sieve tube with a polymer compound to overcome the defect that the thin natural wood plate material is likely to be cracked or broken.

Figure 1:
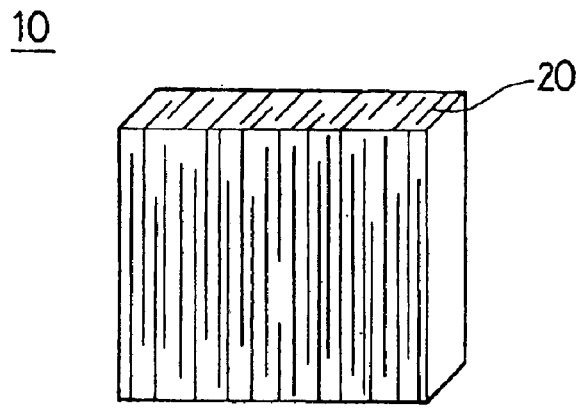
FIG. 1 is a schematic view of a preferred embodiment according to the present invention.
Figure 2:
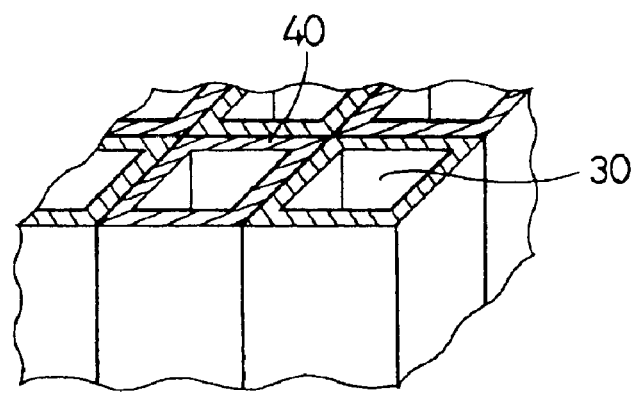
FIG. 2 is a conceptual view showing before and after cavity cells are filled with a polymer compound.
Figure 2:
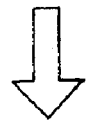
Figure 2:
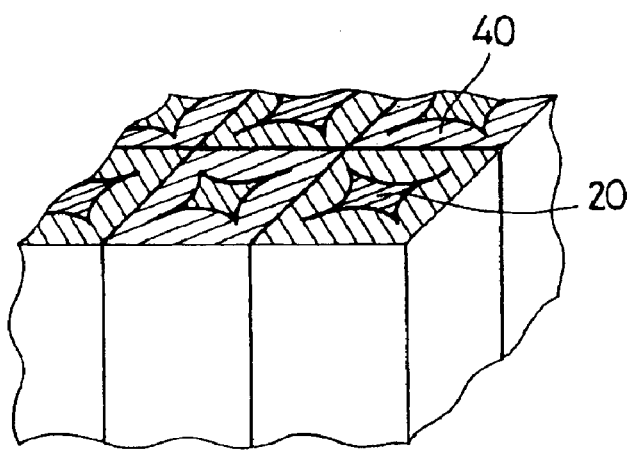
Figure 3:
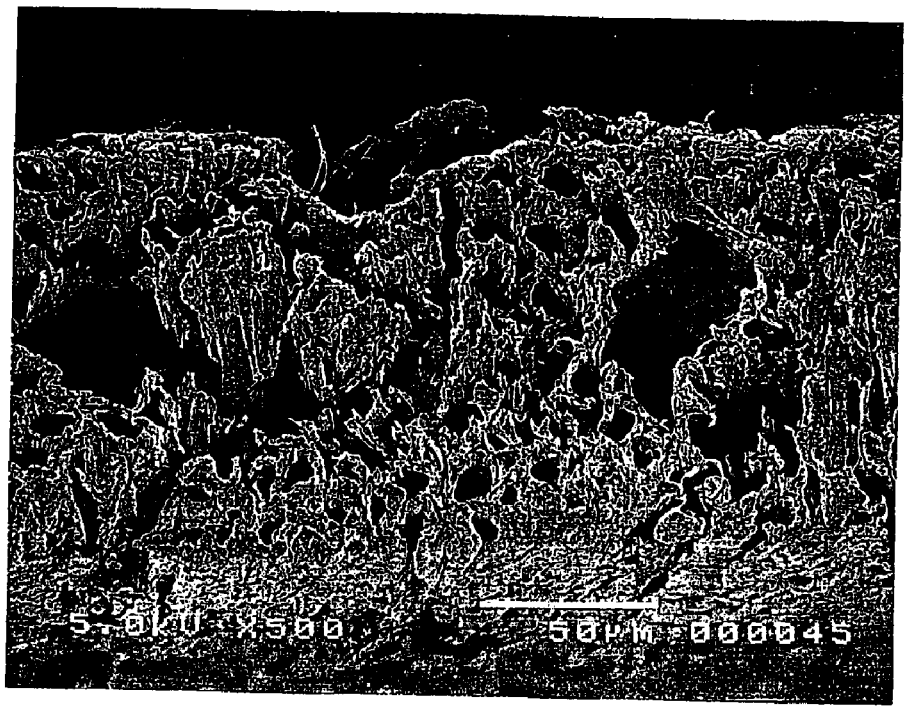
FIG. 3 is a cross-sectional electron microscope photograph of a thin natural wood plate material including cavities.

FIG. 1 is a schematic view of a preferred embodiment of the present invention. Cavity portions in a flexible natural wood sheet 10 are filled with a synthetic resin 20. FIG. 2 is a conceptual view showing cavity cells before and after being filled with a polymer compound. A cavity portion 30 surrounded by a cell membrane 40 is filled with the synthetic resin 20. FIG. 3 is an electron microscope photograph showing the cavities in a thin natural wood plate material, an FIG. 4 is an electron microscope photograph showing the cavities filled with the polymer compound.

Figure 4:
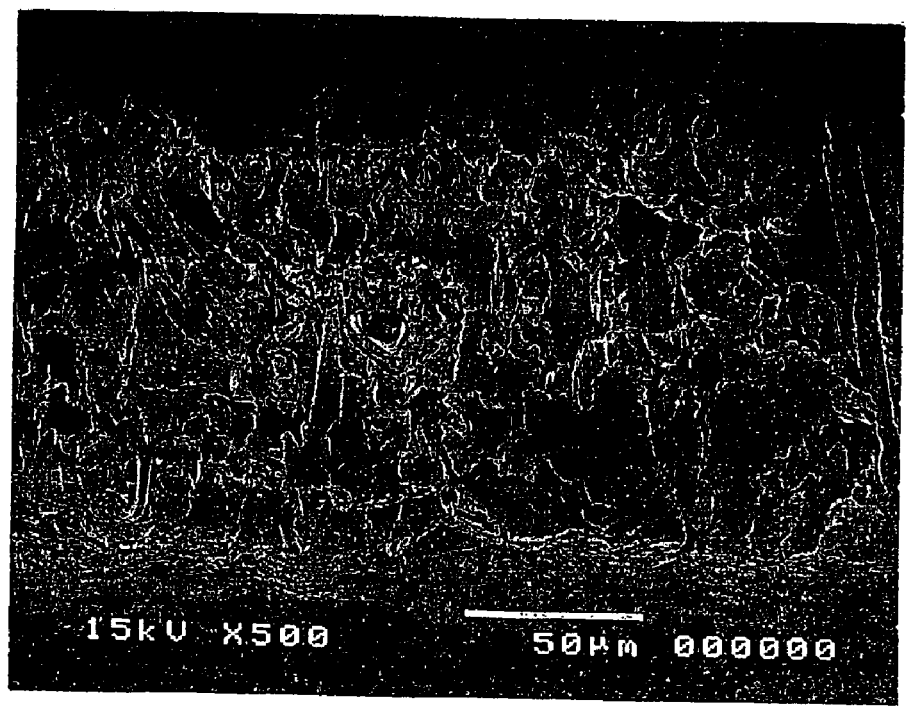
FIG. 4 is a cross-sectional electron microscope photograph of a thin natural wood plate material according to the present invention.

As can be seen in FIG. 4, not all of the cavities are filled with the polymer compound.

A thin natural wood plate material according to the present invention includes a rotary veneer, a sliced veneer, a sawn veneer, and a half-round veneer, and does not limit the types of natural wood to be used. For example, white sycamore, birdseye maple, anigre, teak, bamboo and other suitable woods may be used.

The thin natural wood plate material to be used has a thickness of about 0.1 mm to about 5.0 mm, and preferably, about 0.1 mm to about 1.0 mm. A veneer having a thickness less than about 0.1 mm cannot be mechanically fabricated, whereas it is difficult to fill a veneer having a thickness equal to or greater than about 5.0 mm with a synthetic resin.

Buffing may also be conducted to control the thickness.

A polymer compound used for filling the cavities is preferably a polymer compound in a rubbery state or an elastic gel state. Example of the polymer compound includes a linear polymer synthetic resin such as a polyester resin, a polyamide resin, a cellulosic resin, a styrene resin, an epoxy resin and a urethane resin.

Suitable polyester resins include polyethylene terephthalate, polybutylene terephthalate and other suitable polyester resins. Suitable polyamide resins include polyhexamethylene adipamide, polycapramide and other suitable polyamide resins. Suitable cellulosic resins include hydroxycellulose, acetylcellulose, nitrocellulose, ethylcellulose, cellulose acetate butyrate, cellulose acetate propionate and other suitable cellulosic resins. Suitable styrene resins include a styrene-acryl nitrile copolymer, a styrene-butadiene-acrylonitrile copolymer, a styrene-alkyl acrylate-alkyl methacrylate copolymer and other suitable styrene resins.

Among these resins, a synthetic resin is preferably capable of interacting with a hydroxyl group, for example, a synthetic resin having a hydroxyl group, an amino group, an ether linkage or other suitable synthetic resin. A cellulosic synthetic resin and a styrene resin are preferred, for example, hydroxycellulose, acetylcellulose, a styrene-acryl nitrile copolymer, a styrene-butadiene-acrylonitrile copolymer, a styrene-alkyl acrylate-alkyl methacrylate copolymer and the like are preferred. This is because these synthetic resins have a hydroxyl group or an ether linkage and exhibit elasticity in a swollen state.

Moreover, these synthetic-resins are preferred because cellulose is an element defining a skeletal structure of wood so as to more firmly maintain the synthetic resin through hydrogen bonds between the wood and the synthetic resin. If the synthetic resin is cellulosic, a bond other than the hydrogen bonds, i.e., a Van der Waals bond is also possible.

Furthermore, these synthetic resins are preferred also because water is adsorbed in the skeletal structure of wood due to the effects of ambient humidity even though natural wood is dried. It is difficult to completely remove such adsorbed water.

Various additives may be added to the synthetic resin used herein. For example, additives such as a plasticizer, an antistatic agent, a colorant, a filler, a stabilizer, a fire retardant, an anti-oxidant, a UV-protection agent, an aromatizer, and other suitable additives.

Preferably, a glass transition point of the synthetic resin is at room temperature or lower. If the glass transition point of the synthetic resin is at room temperature or lower, the synthetic resin is in a rubbery state exhibiting elasticity at room temperature. Therefore, the flexible natural wood sheet is prevented from being cracked or broken. Even if the glass transition point of the synthetic resin itself is higher than a room temperature, such a synthetic resin may be used as long as its glass transition point is lowered to a room temperature or lowered by adding an additive.

A molecular weight of the synthetic resin is preferably about 1,500 to about 100,000. If the molecular weight is equal to or larger than about 100,000, a brittle fracture is more likely to occur. If the molecular weight is equal to or lower than about 1,500, the synthetic resin is more likely to be diffused.

A mixture of a synthetic resin and a linear polymer compound is used as a polymer compound so as to accelerate the interaction with the skeletal structure of wood as compared with the case where the synthetic resin alone is used, thereby more firmly maintaining the synthetic resin in the wood. Furthermore, the linear polymer compound causes the synthetic resin to swell, such that the synthetic resin exhibits elasticity.

Suitable linear polymer compounds include polyethylene glycol, polyethylene terephthalate, polyhexamethylene adipamide, polyethylene, polypropylene, polyacrylic acid ester, polyvinyl alcohol and other suitable polymer compounds. However, polyethylene glycol, which generates hydrogen bonds with cellulose forming the skeletal structure of wood, is preferred for use in the present invention. When such a substance is absorbed in a wood material, the skeletal structure of wood swells so as to be easily filled with a synthetic resin. At the same time, the softness is increased because of wetting, which results in greatly improved processibility.

Moreover, since polyethylene glycol interacts not only with the skeletal structure of wood but also with the synthetic resin, the polyethylene glycol acts like a clamp on the synthetic resin and the skeletal structure of wood.

The linear polymer compound may be an oligomer or a pleionomer.

The oligomer is situated between the monomer and the polymer, with a molecular weight of about 1,000 to about 100,000. The pleionomer is an oligomer having a large molecular weight.

Even a linear polymer material having a molecular weight of about 1,000 or less can be used as long as it interacts with the skeletal structure of wood or a synthetic resin. For example, polyethylene glycol having a molecular weight of about 200 can be used.

With a small molecular weight, the linear polymer material is likely to be diffused. This enables the skeletal structure of wood to easily swell, which facilitates the control of swelling.

Preferably, a vapor pressure of the linear polymer compound at an ambient temperature is about 1.3 kPa or lower. If a vapor pressure at an ambient temperature is high, the substance evaporates from the skeletal structure of wood. As a result, since the wood is in a similar state as that of dried wood, it is more likely to crack or break.

Moreover, a linear polymer compound may decompose instead of being evaporated. In this case, the linear polymer compound does not exhibit any vapor pressure.

Suitable methods of filling the synthetic resin and the linear polymer compound include a method of immersing a thin plate material into a solution including the synthetic resin and the linear polymer compound, a method of spraying the solution, a two-step method for immersing a thin plate material into different solutions respectively including the synthetic resin and the linear polymer, a method of polymerizing a monomer of the resin after filling, an immersing process followed by coating, and other suitable methods. However, the method is not limited thereto.

Although there are pad-roll methods, coating methods, printing methods and other methods as a coating method, the method is not limited thereto.

Furthermore, the number of processes of immersing, spraying, and coating is not limited.

A thin natural plate material may be treated with water-soluble cellulose, for example, such as carboxymethyl cellulose before being filled with the synthetic resin and the linear polymer compound. This treatment reinforces a bond between wood cellulose and the synthetic resin.

Cavities in the thin plate material are filled with the synthetic resin and the linear polymer compound at a ratio of about 10% by volume to about 95% by volume.

If the filling ratio is less than about 10% by volume, a crack is likely to occur-when-the thin plate material is bent. If the cavities are filled at a ratio of more than about 95% by volume, it takes long time to fill the cavities. Therefore, production thereof is greatly reduced.

A rebound resilience value of the thin natural wood plate material is preferably about 10 times or less that of an original thin plate material, and more preferably, about 5 times or less. If the rebound resilience value of the thin natural wood plate material exceeds about 10 times that of the original thin plate material, the texture and feeling inherent to the thin natural wood plate material differ from those of the original thin plate material. Therefore, the texture or the feeling of the original plate material is not maintained. Herein, the rebound resilience value is obtained according to a method in JIS L 1096 A (Gurley method).

A flexible natural wood sheet according to the present invention may be backed with a backing material, such as Japanese paper, paper, synthetic paper, butter muslin, non-woven fabric, canvas, a pig skin, a synthetic resin sheet or other suitable backing material so as-to further reinforce the strength. These backing materials may be attached by a conventional method.

The use of a backing material improves the dimensional stability and folding endurance.

Hereinafter, the present invention will be described with reference to examples. The present invention is not limited to these examples.

EXAMPLE 1

A solution obtained by dissolving about 1.18 kg of polyethylene glycol having a molecular weight of about 4,000 into about 10 L of ethanol was prepared. White sycamore lumber having a thickness of about 0.17 mm was heated in the solution at about 180° C. for about 10 minutes, and then was heated at about 120° C. for about 5 minutes in a solution obtained by dissolving about 0.89 kg of hydroxycellulose having a molecular weight of about 60,000 into about 10 L of ethanol. After the heating treatment, the white sycamore lumber was washed with water and then dried. A filling ratio after drying was measured to be about 58% by volume.

The characteristic values of the thus obtained thin natural wood plate material are shown in Table 1.

TABLE 1

| Test Item | Test Result | | | | Testing Method |
|---|---|---|---|---|---|
| | The Present Invention | Raw Wood | Commercial Product A | Commercial Product B | |
| Rebound Resilience (mN) | 17.2 | 4.3 | 65.8 | 48.8 | Method according to JIS L 1096 A (Gurley method), only in a longitudinal direction |
| Folding Endurance (times) | 1000 or more | 0 | 28 | 6 | JIS P 8115, Longitudinal direction |
| Folding Endurance (times) | 1000 or more | 0 | 85 | 15 | JIS P 8115, Horizontal direction |

As is apparent from Table 1, the thin natural wood plate material according to the present invention has rebound resilience close to that of the raw wood as compared with the commercial products, exhibiting softness. The rebound resilience was measured by a method according to JIS L 1096 A (Gurley method).

Moreover, the thin natural wood plate material according to the present invention exhibits greatly improved resilience against breakage with the folding endurance of at least 1000 times in both the longitudinal and the horizontal directions. The folding endurance was measured according to a method as defined in JIS P 8115.

Since the above results are obtained because the thin plate material according to the present invention is filled with the synthetic resin and the linear polymer compound to exhibit elasticity, the synthetic resin and the linear polymer compound filling the plate material provide buffering effects.

On the other hand, it is considered that any improvement in folding endurance is not observed in the commercial products because they do not include such buffering effects.

As comparative examples, a thin raw wood plate without any treatment, commercial raw wood on which a film is attached (commercial product A), and coated commercial raw wood (commercial item B), each having the same thickness, were used.

EXAMPLES 2 TO 5

In a solution of about 500 g of polyethylene glycol having a molecular weight of about 200, about 2.1 g of birdseye maple lumber having a thickness of about 0.15 mm (about 200 mm by about 100 mm) was immersed at a room temperature for about 5 minutes. After removal of polyethylene glycol adhered to the surface, the lumber was coated by coating with an emulsion solution including about 20 parts by weight of-a styrene-acryl copolymer resin (XA-4650 by Tohpe Corporation), about 20 parts by weight of an acrylic copolymer resin (XA-4663A by Tohpe Corporation) and about 4 parts by weight of water such that the quantity of a solid content after drying is about 25g/m$^2$. Furthermore, the lumber was coated by coating with a solution including about 100 parts by weight of an urethane resin (FF urethane mat clear 78-29 by Union Paint Co. Ltd.), about 10 parts by weight of an urethane resin hardener (urethane hardener B-300 by Union Paint Co. Ltd.) and 22 parts by weight of a thinner such that the quantity of a solid content after drying is about 22 g/m$^2$ Based on a density of polymers and a cavity ratio of the birdseye maple lumber, a filling ratio of the thus fabricated thin natural wood plate material was measured to be about 90% by volume. By controlling the immersion time into ethylene glycol and the number of coating of the styrene-acryl copolymer resin, the acrylic copolymer resin and the urethane resin, thin natural wood plate materials having different filling ratios were obtained (respectively at about 10% by volume, about 30% by volume and about 50% by volume).

The characteristic values of the thus obtained thin natural wood plate materials are shown in Table 2.

TABLE 2

| Test Item | Test Result | | | | Testing Method |
| --- | --- | --- | --- | --- | --- |
| | 10% by volume | 30% by volume | 50% by volume | 90% by volume | |
| Rebound Resilience (mN) | 19.3 | 24.2 | 28.1 | 29.7 | Method according to JIS L 1096 A (Gurley method), only in a longitudinal direction |
| Folding Endurance (times) | 10 | 86 | 368 | 1090 | JIS P 8115, Longitudinal direction |

The rebound resilience is measured by a method according to JIS L 1096 A (Gurley method), and the folding endurance is measured as defined in JIS P 8115.

As is apparent from Table 2, the thin natural wood plate material according to the present invention is soft and has folding endurance even at a low filling ratio.

When wood, which is a naturally-occurring polymer, is dried, water in the cells evaporates. As a result, the wood is defined by holes such as vessels continuously penetrating through the structure, cell membranes lacking water and other structures. Since the cell membrane consists of cellulose forming the skeletal structure, hydrogen bonds are generated between cellulose of the cell membrane and the synthetic resin when the cavities are filled with the synthetic resin. Therefore, the synthetic resin is maintained in the cavities.

Moreover, since the linear polymer compound wets cellulose forming-the skeletal structure of the cell membrane and makes it swell, the linear polymer compound facilitates the filling of the synthetic resin. Furthermore, swelling of cellulose forming the skeletal structure and the synthetic resin filling the cavities causes the cellulose to be in contact with the synthetic resin, which prevents the synthetic resin from coming off. FIG. 2 shows a conceptual view thereof.

Furthermore, the synthetic resin and the linear polymer compound in the present invention both form hydrogen bonds. Therefore, the linear polymer compound acts as a clamp to bond the synthetic resin and cellulose with each other.

On the other hand, since the vapor pressure of the linear polymer compound at an ambient temperature is low, it wets the cellulose and maintains a swollen state without evaporating at an ambient temperature. Therefore, the linear polymer compound maintains the flexible natural wood sheet in a soft state.

Furthermore, when the synthetic resin swells, it exhibits elasticity. Therefore, the synthetic resin also imparts flexibility to the flexible natural wood sheet.

The results of the tests clearly show that the flexible natural wood sheet according to the present invention overcomes the disadvantage of a raw thin natural wood plate material that it is easily cracked or broken so as to have softness and resistance and greatly improved folding endurance. Therefore, the flexible natural wood sheet is soft and has peculiar effects in terms of folding endurance. Thus, even in the case where the flexible natural wood sheet is to be sewn, it is not easily cracked or broken as a conventional thin natural wood plate material. Therefore, the flexible natural wood sheet is suitable for use in fields including sewing or stitching.

Moreover, since the surface is not entirely covered with the synthetic resin, the texture and feeling inherent to natural wood remain so as to allow the humidity control effects of natural wood to be demonstrated. Thus, the healing effects are obtained thereby.

On the other hand, the cavities in the thin natural wood plate material are filled with the synthetic resin. Therefore, since the flexible natural wood sheet includes the synthetic resin, the flexible natural wood sheet does not rots.

As described-above, the flexible natural wood sheet according to the present invention has greatly improved folding endurance and therefore does not crack or break by repetitive bending. Therefore, in addition to the applications as a wall paper or a decorative sheet, the flexible natural wood sheet is suitable for use as a bag, a hand bad, a roll-up blind, a material for pocketbook, a covering material for home electric appliances, a material for shoes, a home finishing material for room interior, an interior finishing material for vehicles including automobiles and other purposes.

Since the flexible natural wood sheet has flexibility, for example, it is also suitable to cover an object having a curved surface, for example, the exterior of a metal pipe. Moreover, the flexible natural wood sheet also has the effect that it can be used even at a large curvature owing to the flexibility.

The present invention is not limited to each of the above-described preferred embodiments, and various modifications are possible within the range described in the claims. An embodiment obtained by appropriately combining technical features disclosed in each of the different preferred embodiments is included in the technical scope of the present invention.

What is claimed is:

1. A flexible natural wood sheet, comprising a polymer compound filled into a cavity in a thin natural wood plate material so as to provide folding endurance; wherein
   the thin natural wood plate material has a thickness of about 0.1 mm to about 5.0 mm.

2. The flexible natural wood sheet according to claim 1, wherein the polymer compound is a mixture of a synthetic resin and a linear polymer compound.

3. The flexible natural wood sheet according to claim 2, wherein a glass transition point of the synthetic resin is at room temperature or lower.

4. The flexible natural wood sheet according to claim 2, wherein the synthetic resin is interacts with a hydroxyl group.

5. The flexible natural wood sheet according to claim 2, wherein the synthetic resin includes a hydroxyl group.

6. The flexible natural wood sheet according to claim 2, wherein the synthetic resin includes a cellulosic synthetic resin.

7. The flexible natural wood sheet according to claim 2, a weight-average molecular weight of the synthetic resin is about 1,500 to about 100,000.

8. The flexible natural wood sheet according to claim 2, wherein a vapor pressure of the linear polymer compound at an ambient temperature is about 1.3 kPa or lower.

9. The flexible natural wood sheet according to claim 2, wherein the linear polymer compound interacts with a hydroxyl group.

10. The flexible natural wood sheet according to claim 2, wherein the linear polymer compound is polyethylene glycol.

11. The flexible natural wood sheet according to claim 10, wherein a weight-average molecular weight of polyethylene glycol is about 200 to about 60,000.

12. The flexible natural wood sheet according to claim 1, wherein a content of the polymer compound filling the cavity of the thin natural wood plate, material is about 10% by volume to about 95% by volume.

13. The flexible natural wood sheet according to claim 1, wherein a rebound resilience value of the thin natural wood plate material is about 10 times or less that of an original thin plate material.

* * * * *